(12) United States Patent
Koenig et al.

(10) Patent No.: US 11,489,909 B1
(45) Date of Patent: Nov. 1, 2022

(54) NON-HTTP LAYER 7 PROTOCOL APPLICATIONS RUNNING IN THE BROWSER

(71) Applicant: CLOUDFLARE, INC., San Francisco, CA (US)

(72) Inventors: Killian Koenig, Seattle, WA (US); Dane Orion Knecht, Austin, TX (US); James Royal, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/559,994

(22) Filed: Dec. 22, 2021

Related U.S. Application Data

(60) Provisional application No. 63/175,525, filed on Apr. 15, 2021.

(51) Int. Cl.
*H04L 67/02* (2022.01)
*H04L 9/40* (2022.01)
*H04L 67/51* (2022.01)
*H04L 67/561* (2022.01)

(52) U.S. Cl.
CPC .......... *H04L 67/02* (2013.01); *H04L 63/0435* (2013.01); *H04L 63/0823* (2013.01); *H04L 63/102* (2013.01); *H04L 67/51* (2022.05); *H04L 67/561* (2022.05)

(58) Field of Classification Search
CPC ...................................................... H04L 67/02
See application file for complete search history.

(56) References Cited

U.S. PATENT DOCUMENTS

| 10,958,662 | B1* | 3/2021 | Sole ................... H04L 63/0853 |
| 2011/0138457 | A1* | 6/2011 | Jolfaei .................. H04L 67/133 726/14 |
| 2012/0011578 | A1* | 1/2012 | Hinton ................ H04L 63/0815 726/8 |
| 2014/0372508 | A1* | 12/2014 | Fausak .................... H04L 67/02 709/203 |
| 2014/0372509 | A1* | 12/2014 | Fausak .................... H04L 67/40 709/203 |
| 2020/0106515 | A1* | 4/2020 | Yoshida .................. H04L 45/60 |
| 2021/0099553 | A1* | 4/2021 | Grosjean ............... H04L 69/162 |

FOREIGN PATENT DOCUMENTS

| WO | WO-2011130038 A2 * | 10/2011 | ........... H04L 63/029 |
| WO | WO-2012004185 A1 * | 1/2012 | ......... H04L 63/0815 |
| WO | WO-2018096232 A1 * | 5/2018 | ............. H04L 12/66 |

* cited by examiner

*Primary Examiner* — Esther B. Henderson
(74) *Attorney, Agent, or Firm* — Nicholson De Vos Webster & Elliott LLP

(57) ABSTRACT

Layer 7 protocol (non-HTTP) client applications are executed in the browser. The non-HTTP layer 7 protocol client application connects to a compute server that proxies layer 4 packets to the origin network that has the non-HTTP layer 7 protocol service. As an example, an SSH client (a non-HTTP layer 7 protocol) can execute in the browser and the TCP packets (layer 4 packets) are proxied by a compute server to the origin network that has the appropriate SSH server. The non-HTTP layer 7 protocol client application allows users to run commands or otherwise interact with the client as if they were using a native application (one that is not executed within the browser) without any client-side configuration or agent.

24 Claims, 4 Drawing Sheets

NON-HTTP LAYER 7 PROTOCOL APPLICATIONS RUNNING IN THE BROWSER

CROSS-REFERENCE TO RELATED APPLICATIONS

This application claims the benefit of U.S. Provisional Application No. 63/175,525, filed Apr. 15, 2021, which is hereby incorporated by reference.

FIELD

Embodiments of the invention relate to the field of network communications; and more specifically, to non-HTTP layer 7 protocol applications running in a browser.

BACKGROUND

The internet has historically been open where content including services and applications provided by companies are exposed to the general internet. However, exposing these services and applications to the general internet may not be secure. Since any application on the internet can be a target for an attack, these companies often try to hide the origin server of their application. For example, they may use a proxy to try to mask the origin IP address and/or they may lock down ports to block unwanted traffic. In some cases, Generic Routing Encapsulation (GRE) tunnel or a Virtual Private Network (VPN) is used to secure the services and applications, and to keep their origin hidden. However, GRE tunneling and implementing a VPN is time consuming, requires cross-company coordination, and is not flexible to easily make changes.

Non-web applications (e.g., non-HTTP layer 7 protocol applications), such as secure shell protocol (SSH) applications, remote desktop protocol (RDP) applications, virtual network computing (VNC) applications, introduce challenges. Many of these applications require a thick client and rely on private networks. The client software expects to reach a private IP over a specific protocol. Authentication to these applications relies on legacy approaches. For instance, developers often hold long-lived secure shell protocol (SSH) keys to reach machines and business users keep usernames and passwords on sticky notes. These applications are difficult to integrate with a single sign-on (SSO) provider and implement other controls like device posture. Further, these applications have little to no data control and logging capabilities.

There are some examples of SSH clients executing on the browser. Web browsers cannot natively access Layer 4 sockets (e.g., TCP sockets, UDP sockets) so the SSH clients executing on the browser cannot directly access layer 4 sockets to communicate with an SSH server. To solve this problem, most of these implementations use an agent that is installed at an intermediary device that acts as the SSH client that is connected to the SSH server, where the web browser application communicates to the agent using a proprietary or otherwise non-SSH protocol. Thus, the web browser application is not a true SSH client.

SUMMARY

Layer 7 protocol (non-HTTP) client applications are executed in the browser. The non-HTTP layer 7 protocol client application connects to a compute server that proxies layer 4 packets to the origin network that has the non-HTTP layer 7 protocol service. As an example, an SSH client (a non-HTTP layer 7 protocol) can execute in the browser and the TCP packets (layer 4 packets) are proxied by a compute server to the origin network that has the appropriate SSH server. The non-HTTP layer 7 protocol client application allows users to run commands or otherwise interact with the client as if they were using a native application (one that is not executed within the browser) without any client-side configuration or agent.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
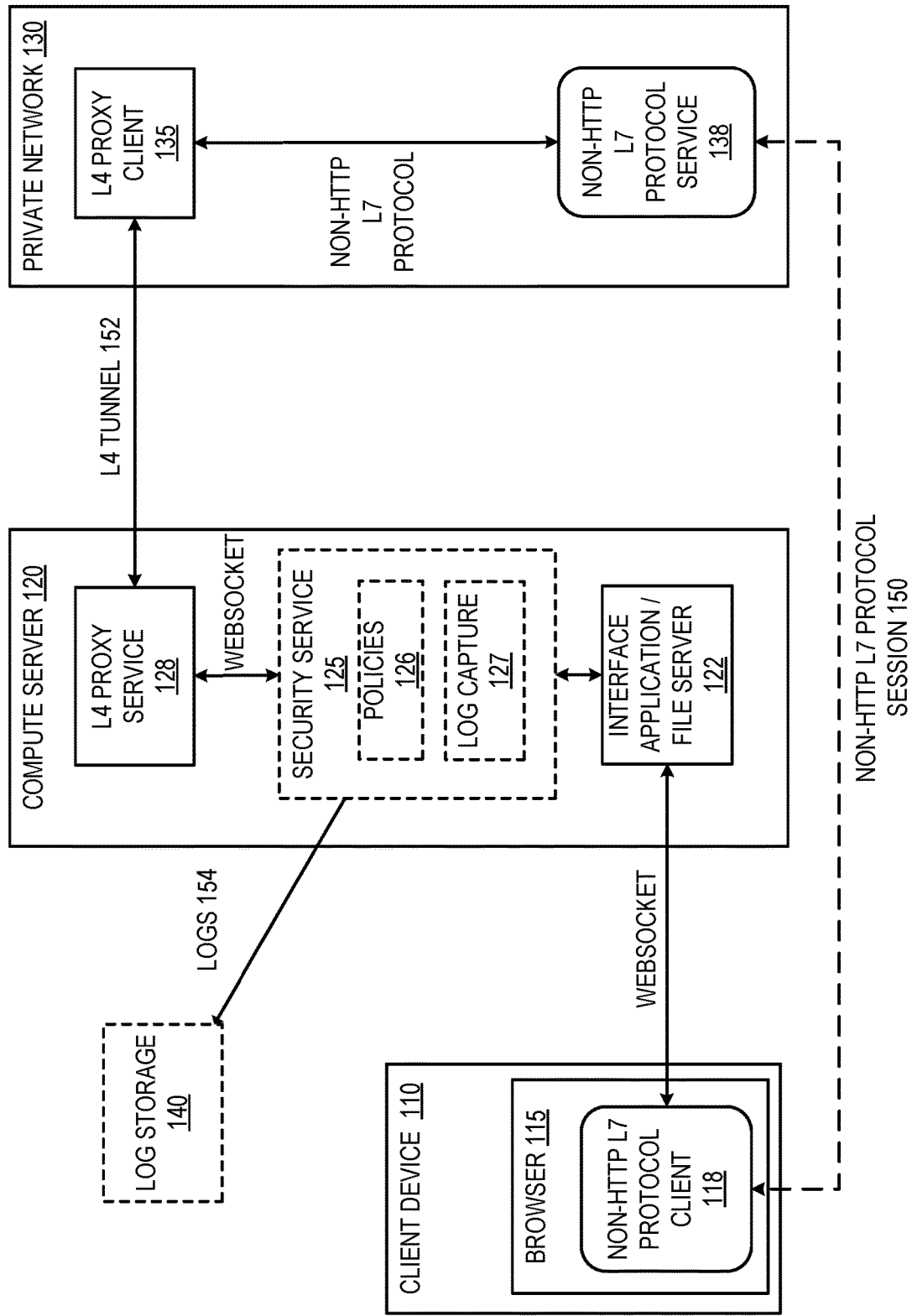
FIG. 1 is a block diagram that illustrates a system for executing non-HTTP layer 7 protocol client applications in the browser according to an embodiment.

Layer 7 protocol (non-HTTP) client applications are executed in the browser. The non-HTTP layer 7 protocol client application connects to a compute server that proxies layer 4 packets to the origin network that has the non-HTTP layer 7 protocol service. As an example, an SSH client (a non-HTTP layer 7 protocol) can execute in the browser and the TCP packets (layer 4 packets) are proxied by a compute server to the origin network that has the appropriate SSH server. The non-HTTP layer 7 protocol client application allows users to run commands or otherwise interact with the client as if they were using a native application (one that is not executed within the browser) without any client-side configuration or agent. In an embodiment, the non-HTTP layer 7 protocol client application is compiled into a WebAssembly (Wasm) file that is executed by the browser.

In an embodiment, the browser can render a fully functional non-HTTP layer 7 protocol client application that a user can launch with a single click or selection. A user can be authenticated with the single sign-on (SSO) of their organization and access policies for the resource may be checked.

In an embodiment, the compute server may apply one or more policies to the traffic of the non-HTTP layer 7 service. The one or more policies may be based on identity, device posture, location, and/or risk signals, for example. The one or more policies may be defined by the operator of the non-HTTP layer 7 service. For example, the operator may specify what user(s) (e.g., identified by email address, phone number, name, device name, identifier, group, country, etc.) are allowed and/or not allowed to access the non-HTTP layer 7 service. Additionally, or alternatively, the operator may specify device posture requirements for access to the non-HTTP layer 7 service. The device posture may be provided from third-party endpoint security providers. The one or more policies allow organizations to build rules that control who in the organization (or external users) can transfer data to or away from a machine over a particular non-HTTP layer 7 application (e.g., over an SSH connection or to a remote desktop over RDP). These rules could be based on machine, user and/or group identity, country, and/or device.

In an embodiment, the compute server may log, report, and/or record session data of the non-HTTP layer 7 service. For instance, each event of the session may be logged and/or recorded. The event(s) may be configured by the operator of the non-HTTP layer 7 service. The logged and/or recorded data can be sent to an external storage location (e.g., the data may be batched and sent in intervals).

Thus, once a user has been approved, the user can use the non-HTTP layer 7 protocol client application in the browser as if they were using the native application without any client-side configuration or agent. The distributed edge compute and routing service may accelerate the connection, apply rules regarding what data transfers can take place, and/or record the session for administrators to audit as needed.

FIG. 1 is a block diagram that illustrates a system for executing non-HTTP layer 7 protocol client applications in the browser according to an embodiment. The system includes the client device 110 that executes the browser 115, the compute server 120, and the private network 130.

The client device 110 is a computing device (e.g., laptop, workstation, smartphone, mobile phone, tablet, gaming system, set top box, wearable device, Internet of Things (IoT) device, etc.) that can transmit and/or receive network traffic through the web browser 115.

The compute server 120 is a computing device that may be part of a distributed edge compute and routing service provided by a distributed edge compute and routing network. Such a distributed edge compute and routing service may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services. The compute server 120 may be one of multiple compute servers within a datacenter and there may be similar compute servers located in multiple datacenters that are geographically distributed. Each datacenter may also include one or more control servers, one or more domain name system (DNS) servers, and/or one or more other pieces of network equipment such as router(s), switch(es), and/or hub(s). In an embodiment, each compute server within a datacenter may process internet traffic (e.g., transmission control protocol (TCP), user datagram protocol (UDP), HTTP/S, SPDY, file transfer protocol (FTP), IPSec, session initiation protocol (SIP), or other IP protocol traffic).

The private network 130 includes a private application or service running on an origin network. For instance, the non-HTTP layer 7 protocol service 138 may be running on an origin server within the private network 130. The operator of the private network 130 may have content (e.g., application, service, etc.) to secure without the content being exposed to the general internet. The content may be running locally on the origin server or behind a firewall/NAT. To connect this private network 130 to the distributed edge compute and routing service, in an embodiment the L4 proxy client 135 connects to the L4 proxy service 128 and requests an L4 tunnel be established between the private network 130 and the distributed edge compute and routing service. In an embodiment, the L4 proxy client 135 connects to a compute server that is closest to the private network 130 via an anycast protocol implementation. In another embodiment, the L4 proxy client 135 connects to a compute server via a site-local address (a private address that is not globally routable) for the compute server 120. The connection to the L4 proxy service 128 is over an encrypted L4 tunnel 152. The connection may be secured with a pinned certificate embedded in the L4 proxy client 135. The L4 proxy client 135 may be configured to send configuration information for the tunnel to the L4 proxy service 128. The configuration information may include authentication information (e.g., username/password, an access token (e.g., an application programming interface (API) key), cryptographic identity (e.g., a certificate), and/or email address), transport layer security (TLS) configuration information (e.g., type of TLS supported), port, and/or hostname that traffic should be received on. The L4 proxy service 128 may forward the request to a tunnel control service for establishing the L4 tunnel or may establish the L4 tunnel itself. Establishing the tunnel may include authenticating the request and configuring a DNS zone and possibly a tunnel subdomain zone (used as a canonical name (CNAME) target and an alternative way of accessing the tunnel). For example, a tunneled hostname may appear as a CNAME to a subdomain of a dedicated domain for the tunneling service. A unique IP address may be assigned to the tunnel. Multiple streams of data and control may be multiplexed over a single established tunnel. In an embodiment, the L4 proxy client 135 connects over secure sessions to multiple L4 proxy services running on multiple compute servers of the distributed edge compute and routing service to request multiple tunnels be established respectively for the same hostname.

The L4 proxy service 128 on the compute server 120 accepts tunnel connection requests such as from the L4 proxy client 135. The L4 proxy service 128 sends the tunnel connection request to a tunnel control service of a control server. The tunnel connection request may include the configuration information for the tunnel. The control server may be a centralized server that is connected with multiple datacenters. The L4 proxy service 128 may also include a communication server (e.g., a Remote Procedure Call (RPC) server, HTTP REST server, etc.), that can be used by the tunnel control service to inspect, shutdown, and/or redirect tunnels. The L4 proxy service 128 may also communicate with the interface application/file server 122 of the compute server 120 to proxy requests for the tunnel hostname to the private network.

After establishing the L4 tunnel(s), data can be transmitted over the established L4 tunnel(s). For instance, a compute server of the distributed edge compute and routing service may receive an HTTP request for the tunneled hostname, identify the intended origin server, and transmit the HTTP request towards, or over, the established L4 tunnel. If the receiving compute server does not have a tunnel to the private network for the tunneled hostname, that compute server determines which compute server to transmit the HTTP request and routes the traffic accordingly. In an embodiment, which will be described in greater detail later herein, the routing between compute servers is performed intelligently based on traffic information (e.g., latency, packet loss data) gathered from other requests that traverse the distributed edge compute and routing service.

The interface application/file server 122 retrieves the file(s) that the browser 115 requests including the files that execute the non-HTTP L7 protocol client 118. For instance, the interface application/file server 122 may retrieve client-side script(s), cascading style sheets (CSS), HTML, and/or WASM file(s) as requested by the browser 115. The files may be sent over a websocket between the browser 115 and the compute server 120. The non-HTTP layer 7 protocol client allows users to run commands or otherwise interact with the client as if they were using a native application (one that is not executed within the browser) without any client-side configuration or agent.

The compute server 120 includes the security service 125 according to an embodiment. The security service 125 applies one or more policies 126 to the traffic of the non-HTTP layer 7 service. The one or more policies may be based on identity, device posture, location, and/or risk signals, for example. The one or more policies may be defined by the operator of the non-HTTP layer 7 service. For example, the operator may specify what user(s) (e.g., identified by email address, phone number, name, device name, identifier, group, country, etc.) are allowed and/or not allowed to access the non-HTTP layer 7 service. Additionally, or alternatively, the operator may specify device posture requirements for access to the non-HTTP layer 7 service. The device posture may be provided from third-party endpoint security providers. The security service 125 may also perform log capture 127 and/or recording of session data of the non-HTTP layer 7 service. For instance, each event of the session may be logged and/or recorded. The event(s) may be configured by the operator of the non-HTTP layer 7 service. The logged and/or recorded data 154 can be sent to an external storage location 140 (e.g., the data may be batched and sent in intervals).

The compute server 120 proxies the layer 4 packets received over the WebSocket to the non-HTTP layer 7 service 138. For instance, the L4 proxy service 128 proxies the layer 4 packets received over the WebSocket over the L4 tunnel 152 to the L4 proxy client 135 at operation 232. The L4 proxy client 135 receives the data and forwards the data to the non-HTTP L7 protocol service 138 at operation 234. Thus, a non-HTTP L7 protocol session 150 is logically created between the non-HTTP L7 protocol client 118 and the non-HTTP L7 protocol service 138. Since the server-side proxy happens at the L4 level only, the session may be end-to-end encrypted between the client executing on the web browser and the remote service.

Figure 2:
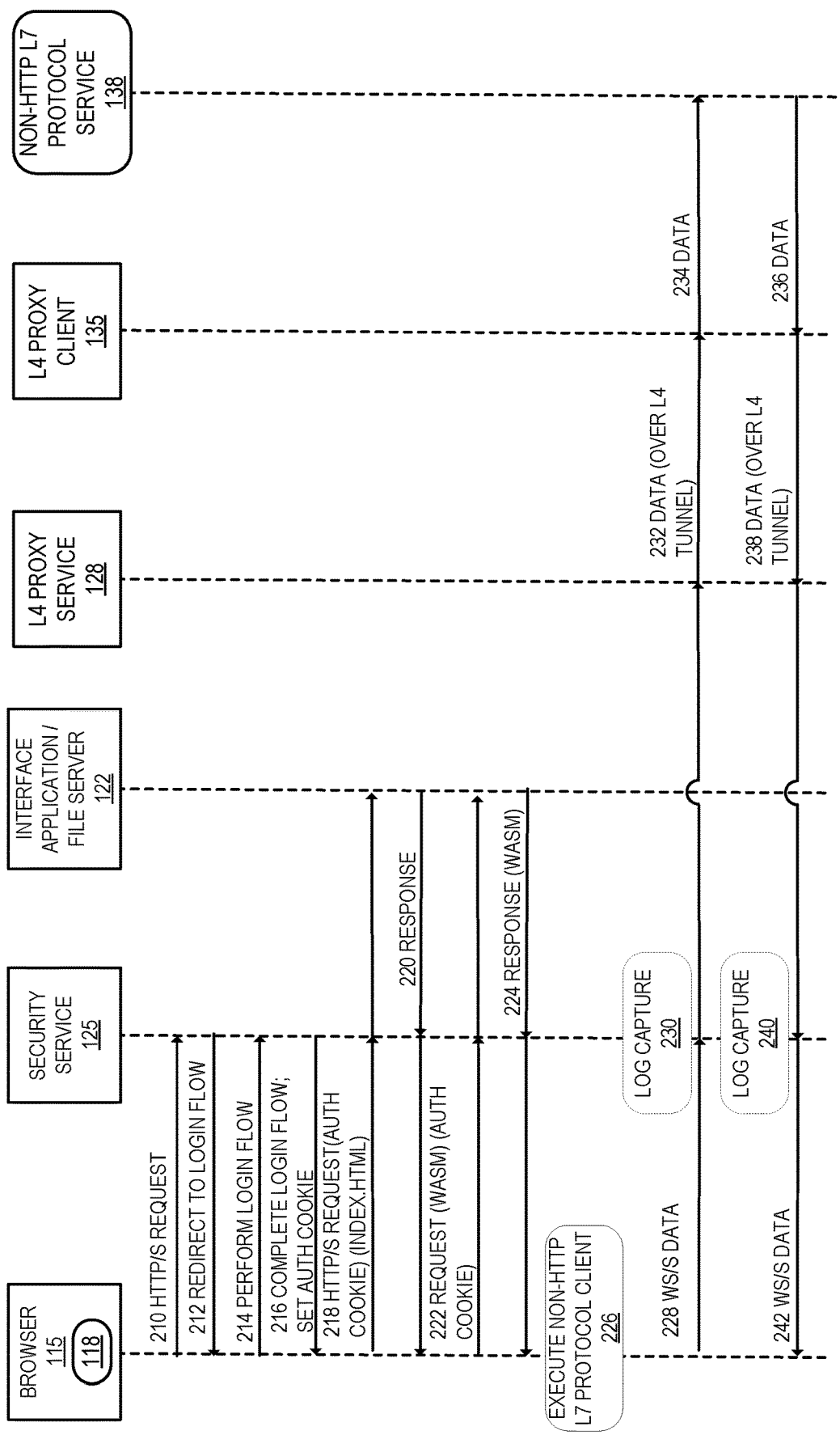
FIG. 2 is a sequence diagram that illustrates exemplary operations for executing non-HTTP layer 7 protocol applications in the browser according to an embodiment.

FIG. 2 is a sequence diagram that illustrates exemplary operations for executing non-HTTP layer 7 protocol applications in the browser according to an embodiment. At operation 210, the browser 115 executing on the client device 110 makes an HTTP(s) request for a domain, e.g., https://mytunnel.com. In embodiments where the compute server 120 is one of multiple compute servers of a distributed edge compute and routing service, the compute server 120 may receive the request because it is the closest one of the compute servers to the client device 110 in terms of routing protocol configuration (e.g., border gateway protocol (BGP) configuration) according to an anycast implementation or due to a geographical load balancer. Although not shown in FIG. 2, the interface application/file server 122 may receive this request and forward the request to the security service 125.

In an embodiment, the request may be triggered by a user navigating to a dashboard or other page that includes a listing of one or more non-HTTP layer 7 protocol applications and the user selecting one of the non-HTTP layer 7 protocol applications listed or by visiting the application directly. This dashboard or page may be tailored to the permissions of the users. For instance, an organization user may login to a page controlled by the organization that displays the non-HTTP layer 7 protocol applications that is available to that user. The user can select any of the displayed applications without leaving their browser to launch the application. This may cause the initial request that launches the initial login flow to authorize them for the session so that the user can begin doing work without modifying any configuration files or editing clients locally.

The security service 125 may perform identity authentication. For instance, if a valid user session is not established, at operation 212, the security service 125 redirects the browser 115 to perform a login flow. The browser may be presented with one or more identity providers for providing identity information. The one or more identity providers may be configured by the organization. Each identity provider may have its own requirements or rules that must be followed to prove identity. Regardless of the technique, in the example of FIG. 2, the browser 115 performs the login flow at operation 214.

The security service 125 completes the login flow process at operation 216 and sets a cookie that specifies that the user is authorized for the request. As part of processing the login flow, the security service 125 may determine whether the user is allowed to access the non-HTTP layer 7 protocol application based on a set of one or more policies. The one or more policies may be based on identity, device posture, location, and/or risk signals, for example. The one or more policies may be defined by the operator of the non-HTTP layer 7 protocol service. For example, the operator may specify what user(s) (e.g., identified by email address, phone number, name, device name, identifier, group, country, etc.) are allowed and/or not allowed to access the non-HTTP layer 7 service. Additionally, or alternatively, the operator may specify device posture requirements for access to the non-HTTP layer 7 service. The device posture may be provided from third-party endpoint security providers.

At operation 218, the browser 115 executing on the client device 110 makes an HTTP/S request for the domain, e.g., https://mytunnel.com, and includes the set authorization cookie. This request is like the request received at operation 210 with the addition of the authorization cookie. The security service 125 may apply the one or more policies to determine whether the HTTP/S request is allowed to be processed. Assuming that the request is allowed to be processed, the interface application/file server 122 processes the request. Processing the request may include retrieving the requested resource (e.g., index.html at mytunnel.com) from the origin or from a local storage. Assuming that the requested resource is available, the interface application/file server 122 transmits a response that includes the requested resource at operation 220.

The initial requested resource (e.g., index.html) may include one or more additional resources used for the non-HTTP layer 7 protocol application. Example additional resources include a WebAssembly file, a client-side script, a stylesheet, and/or other HTML. In the example of FIG. 2, the non-HTTP layer 7 protocol client application has been compiled into a WebAssembly file. Thus, at operation 222, the browser 115 transmits a request for the WebAssembly file that is received by the compute server 120. The request includes the authorization cookie in some embodiments. The security service 125 may apply the one or more policies to determine whether the request is allowed to be processed. Assuming that the request is allowed to be processed, the interface application/file server 122 processes the request. Processing the request may include retrieving the requested resource (e.g., the WebAssembly file) from the origin or from a local storage. Assuming that the requested resource is available, the interface application/file server 122 transmits a response that includes the requested resource at operation 224.

The browser 115 executes the WebAssembly file. The WebAssembly file is code that when executed by the browser 115, executes a non-HTTP layer 7 protocol client at operation 226. For instance, an SSH client may be compiled into the WebAssembly file and therefore an SSH client may be executed within the browser. Depending on the non-HTTP layer 7 protocol client application, the user may be required to authenticate with the non-HTTP layer 7 protocol service. For instance, if the client application is an SSH client, the user may need to authenticate with the remote SSH server. The available authentication methods vary based on server configuration but may include password authentication (e.g., through a prompt to the user), public key authentication (e.g., through a prompt to the user), or automatically through a certificate authentication.

In a certificate authentication method, the non-HTTP layer 7 protocol client generates a keypair and sends a request with the public key to a signing endpoint (e.g., part of the distributed edge compute and routing service and may be executed on the compute server 120). The request may also include a token that is issued during login that proves the user has been authenticated. The signing endpoint generates a signed certificate and returns it to the non-HTTP layer 7 protocol client. The signed public key and the generated private key are used to authenticate with the remote SSH server. This certificate may be valid for a relatively short period (e.g., minutes).

Sometime later, at operation 228, the non-HTTP L7 protocol client 118 executing within the browser 115 transmits data that is related to the non-HTTP layer 7 protocol service and that data is received at the compute server 120. The data is transmitted using the protocol of the non-HTTP layer 7 protocol service. For example, if the client application is an SSH client, the data is transmitted in accordance with the SSH protocol. The data may be transmitted over a WebSocket between the client device 110 and the compute server 120. The transmission uses a layer 4 protocol such as TCP or UDP. In an embodiment, the index page may cause a client-side script (e.g., JavaScript) to be downloaded that initiates the WebSocket connection and draws the page. This client-side script may send data from the WebSocket to and from the WebAssembly code that implements the majority of the logic for the non-HTTP L7 protocol client 118.

The compute server 120 receives the non-HTTP layer 7 protocol service data. The security service 125 may perform one or more actions after receiving the data. In an embodiment, the security service 125 applies the set of one or more policies to determine whether the data or the requested connection is allowed. In an embodiment, in addition to or in lieu of applying the policies, the security service 125 performs the log capture operation 230 where the security service 125 may log, record, and/or report the session data of the non-HTTP layer 7 service. For instance, each event of the session may be logged, recorded, and/or reported. The event(s) may be configured by the operator of the non-HTTP layer 7 service. The logged and/or recorded data can be sent to an external storage location (e.g., the data may be batched and sent in intervals).

The compute server 120 proxies the layer 4 packets received over the WebSocket to the non-HTTP layer 7 service 138. For instance, the L4 proxy service 128 proxies the layer 4 packets received over the WebSocket over the L4 tunnel 152 to the L4 proxy client 135 at operation 232. The L4 proxy client 135 receives the data and forwards the data to the non-HTTP L7 protocol service 138 at operation 234.

The non-HTTP layer 7 protocol service 138 may transmit data to the non-HTTP layer 7 protocol client 118. Thus, at operation 236, the non-HTTP layer 7 protocol service 138 transmits data related to the session. The data is received at the L4 proxy client 135 that forwards the data at operation 238 over the L4 tunnel 152 to the L4 proxy service 128. The L4 proxy service 128 forwards the traffic to the security service 125. The security service 125 may perform one or more actions after receiving the data such as performing the log capture operation 240 where the security service 125 may log, record, and/or report the session data of the non-HTTP layer 7 service. The data is transmitted to the non-HTTP layer 7 protocol client 118 at operation 242 over the WebSocket.

The embodiment shown in FIG. 2 proxies the layer 4 packets over an existing L4 tunnel. However, embodiments are not so limited. If an L4 tunnel does not exist between the compute server 120 and the private network 130, an L4 tunnel can be created.

In some embodiments, the compute server 120 that receives traffic from the client device 110 does not have a tunnel established with the non-HTTP L7 protocol service; instead, a different compute server of the distributed edge compute and routing service may have an established tunnel to the non-HTTP L7 protocol service. In such a case, the compute server 120 may route the traffic toward the computed server that is connected with an L4 tunnel to the non-HTTP L7 protocol service. There may be many compute servers (along with other network equipment) between the compute server that initially receives the traffic and a compute server with a tunnel for the non-HTTP L7 protocol service. For instance, if an origin server is in London and a tunnel is created from a compute server in London to the origin server, and traffic is sent from a client device in California that is received at a compute server in California, the traffic may be routed over multiple compute servers between California and London.

In an embodiment, in conjunction with establishing a tunnel, routing rules are installed in the compute servers of the distributed edge compute and routing service to reach the tunneled destination. In an embodiment, the routing between compute server(s) is performed intelligently based on traffic information (e.g., latency, packet loss data) gathered from other requests that traverse the distributed edge compute and routing service. This allows the distributed edge compute and routing service to pick the best path to the non-HTTP L7 protocol service (e.g., the fastest, most reliable, etc.) depending on current network conditions. In an embodiment, the routing between compute server(s) is based on carrier information. For example, some of the IP address(es) assigned to the tunnel may be from different carriers that may have different routes that can be taken through the distributed edge compute and routing service. The routing may find the optimal path to the non-HTTP L7 protocol service based on which carrier is selected for the routing, which may be based on factors such as speed, reliability, and/or cost. For instance, the prices of different cloud providers can be monitored (the prices can change relatively quickly depending on demand and sales) and the cheaper route can be taken.

Figure 3:
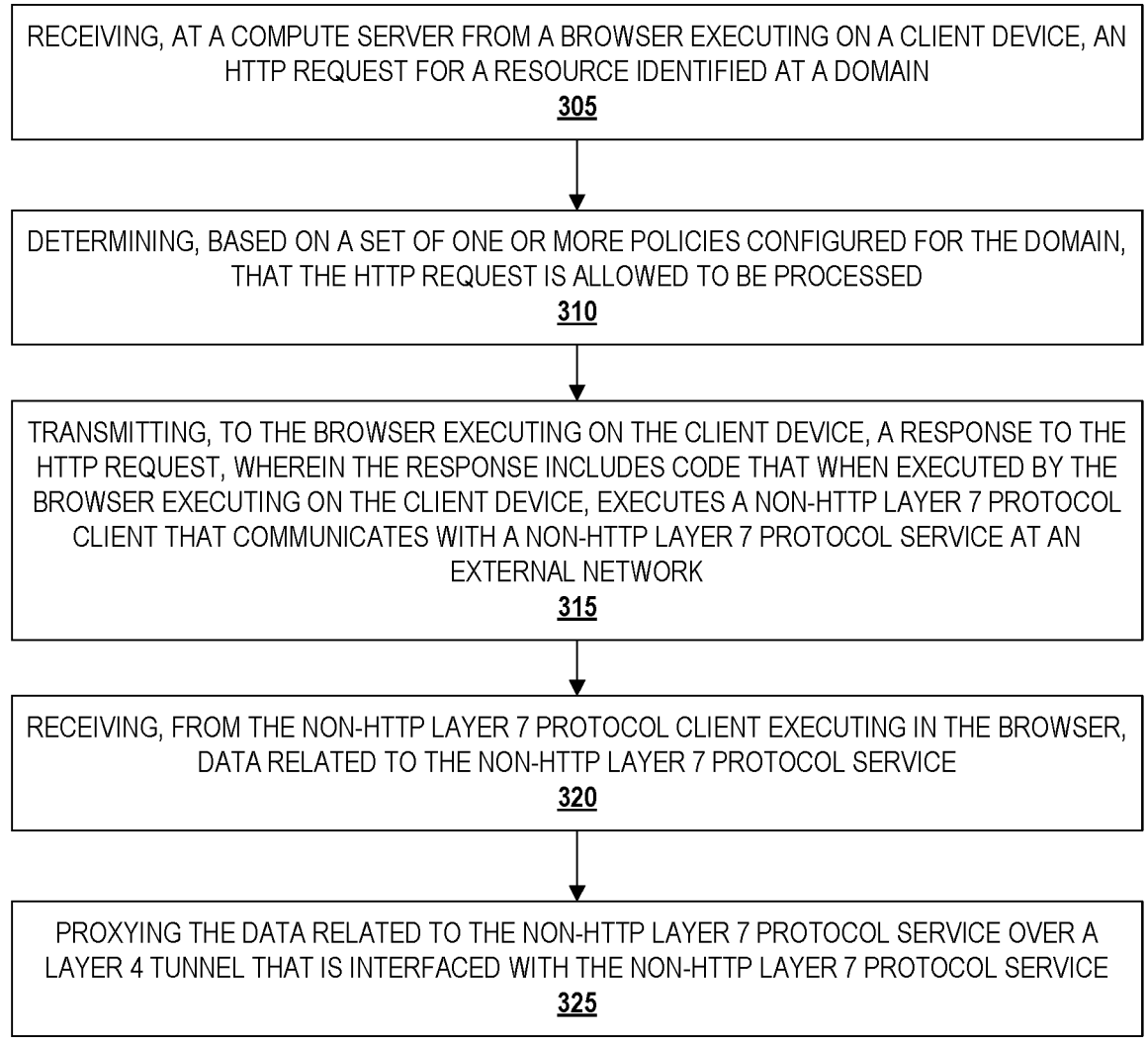
FIG. 3 is a flow diagram that illustrates exemplary operations for executing non-HTTP layer 7 protocol applications in the browser according to an embodiment.

FIG. 3 is a flow diagram that illustrates exemplary operations for executing non-HTTP layer 7 protocol applications in the browser according to an embodiment. At operation 305, the compute server 120 receives a request from a browser 115 (e.g., an HTTP/S request) for a resource identified at a domain. Next, at operation 310, the compute server 120 determines, based on a set of one or more policies configured for the domain, that the request is allowed to be processed. The one or more policies may be based on one or more of identity, device posture, location, and/or risk signals. If the request was not allowed to be processed, then the request would not be processed (e.g., the request would be dropped).

Next, at operation 315, the compute server 120 transmits to the browser 115 a response to the request, where the response includes code that when executed by the browser 115, causes a non-HTTP layer 7 protocol client to be executed, where that client communicates with a non-HTTP layer 7 protocol service at an external network. In an embodiment, the code is in a WebAssembly format. In an embodiment, the non-HTTP layer 7 protocol client is an SSH client, and the non-HTTP layer 7 protocol service is an SSH server. The SSH client may execute in a tab of the browser 115. Depending on the non-HTTP layer 7 protocol client, the user may be required to authenticate to the non-HTTP layer 7 protocol service. The non-HTTP layer 7 protocol client may present a login prompt to the user and/or a public key prompt to the user for authentication. A certificate generation and authentication may also be performed automatically that allows the user to begin using the application without providing login details.

Next, at operation 320, the compute server 120 receives, from the non-HTTP layer 7 protocol executing in the browser 115, data related to the non-HTTP layer 7 protocol service. The data is transmitted using the protocol of the non-HTTP layer 7 protocol service. For example, if the client application is an SSH client, the data is transmitted in accordance with the SSH protocol. The data may be transmitted over a WebSocket between the client device 110 and the compute server 120. The transmission uses a layer 4 protocol such as TCP or UDP. In an embodiment, the compute server performs logging and/or recording of the data received from the non-HTTP layer 7 protocol client executing in the browser. The logged and/or recorded data may be transmitted to a storage location for later retrieval.

Next, at operation 325, the compute server 120 proxies the data related to the non-HTTP L7 protocol service over the L4 tunnel 152 that is interfaced with the non-HTTP L7 protocol service. For instance, the L4 proxy service 128 proxies the layer 4 packets received over the WebSocket over the L4 tunnel 152 to the L4 proxy client 135. The L4 proxy client 135 receives the data and forwards the data to the non-HTTP L7 protocol service 138.

Figure 4:
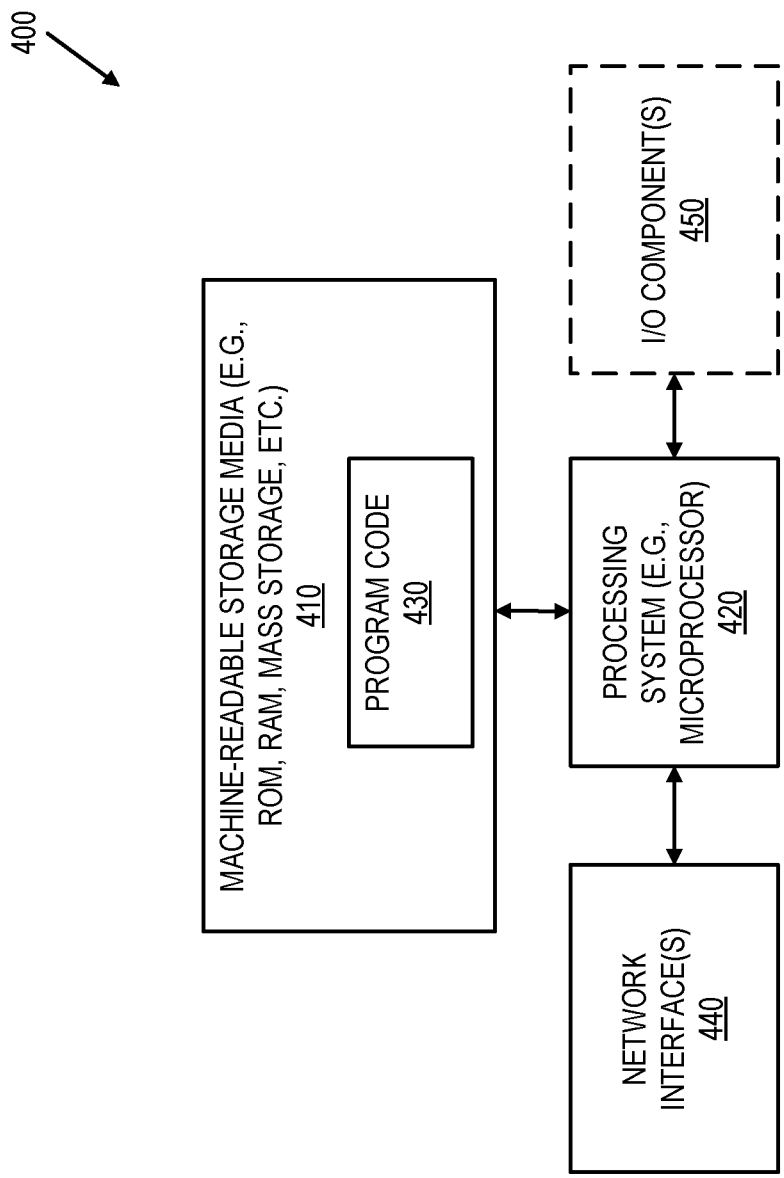
FIG. 4 illustrates a block diagram for an exemplary data processing system that may be used in some embodiments.

FIG. 4 illustrates a block diagram for an exemplary data processing system 400 that may be used in some embodiments. One or more such data processing systems 400 may be used to implement the embodiments and operations described with respect to the compute servers or other computing devices. The data processing system 400 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 420 (e.g., one or more processors and connected system components such as multiple connected chips). For example, the depicted machine-readable storage media 410 may store program code 430 that, when executed by the processor(s) 420, causes the data processing system 400 to perform any of the operations described herein.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 400, and, in certain embodiments, fewer components than that shown in one or more buses may be used to interconnect the various components shown in FIG. 4.

The techniques shown in the figures can be implemented using code and data stored and executed on one or more computing devices (e.g., a compute server, a client device, an origin server). Such computing devices store and communicate (internally and/or with other computing devices over a network) code and data using computer-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such computing devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given computing device typically stores code and/or data for execution on the set of one or more processors of that computing device. Of course, one or more parts of an embodiment of the invention may be implemented using different combinations In the preceding description, numerous specific details are set forth. However, it is understood that embodiments may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether explicitly described.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at a compute server from a browser executing on a client device, an HTTP request for a resource identified at a domain;
determining, based on a set of one or more policies configured for the domain, that the HTTP request is allowed to be processed;
transmitting, to the browser executing on the client device, a response to the HTTP request, wherein the response includes code that when executed by the browser executing on the client device, executes a non-HTTP layer 7 protocol client that communicates with a non-HTTP layer 7 protocol service at an external network;
receiving, from the non-HTTP layer 7 protocol client executing in the browser, data related to the non-HTTP layer 7 protocol service; and
proxying the data related to the non-HTTP layer 7 protocol service over a layer 4 tunnel that is interfaced with the non-HTTP layer 7 protocol service.

2. The method of claim 1, wherein the code is in a WebAssembly format.

3. The method of claim 1, wherein the non-HTTP layer 7 protocol client is a Secure Shell Protocol (SSH) client, wherein the non-HTTP layer 7 protocol service is a SSH server, and wherein the SSH client executes in a tab of the browser.

4. The method of claim 1, further comprising:
logging event data received from the non-HTTP layer 7 protocol client executing in the browser.

5. The method of claim 1, wherein the data related to the non-HTTP layer 7 protocol service is received over a WebSocket between the browser and the compute server.

6. The method of claim 1, wherein the set of one or more policies are based on one or more of identity, device posture, location, and/or risk signals.

7. The method of claim 1, further comprising:
authenticating a user of the non-HTTP layer 7 protocol client with the non-HTTP layer 7 protocol service.

8. The method of claim 7, wherein authenticating the user includes performing one of: presenting a login prompt, presenting a prompt for a public key, and automatically performing a certificate generation and authentication.

9. A non-transitory machine-readable storage medium that provides instructions that, if executed by a processor, will cause said processor to perform the following operations:
receiving, at a compute server from a browser executing on a client device, an HTTP request for a resource identified at a domain;
determining, based on a set of one or more policies configured for the domain, that the HTTP request is allowed to be processed;
transmitting, to the browser executing on the client device, a response to the HTTP request, wherein the response includes code that when executed by the browser executing on the client device, executes a non-HTTP layer 7 protocol client that communicates with a non-HTTP layer 7 protocol service at an external network;
receiving, from the non-HTTP layer 7 protocol client executing in the browser, data related to the non-HTTP layer 7 protocol service; and
proxying the data related to the non-HTTP layer 7 protocol service over a layer 4 tunnel that is interfaced with the non-HTTP layer 7 protocol service.

10. The non-transitory machine-readable storage medium of claim 9, wherein the code is in a WebAssembly format.

11. The non-transitory machine-readable storage medium of claim 9, wherein the non-HTTP layer 7 protocol client is a Secure Shell Protocol (SSH) client, wherein the non-HTTP layer 7 protocol service is a SSH server, and wherein the SSH client executes in a tab of the browser.

12. The non-transitory machine-readable storage medium of claim 9, wherein the operations further comprise:
logging event data received from the non-HTTP layer 7 protocol client executing in the browser.

13. The non-transitory machine-readable storage medium of claim 9, wherein the data related to the non-HTTP layer 7 protocol service is received over a WebSocket between the browser and the compute server.

14. The non-transitory machine-readable storage medium of claim 9, wherein the set of one or more policies are based on one or more of identity, device posture, location, and/or risk signals.

15. The non-transitory machine-readable storage medium of claim 9, wherein the operations further comprise:
authenticating a user of the non-HTTP layer 7 protocol client with the non-HTTP layer 7 protocol service.

16. The non-transitory machine-readable storage medium of claim 15, wherein authenticating the user includes performing one of: presenting a login prompt, presenting a prompt for a public key, and automatically performing a certificate generation and authentication.

17. A server, comprising:
a processor; and
a non-transitory machine-readable storage medium that provides instructions that, if executed by the processor, will cause the server to perform the following operations:
receiving, at a compute server from a browser executing on a client device, an HTTP request for a resource identified at a domain;
determining, based on a set of one or more policies configured for the domain, that the HTTP request is allowed to be processed;
transmitting, to the browser executing on the client device, a response to the HTTP request, wherein the response includes code that when executed by the browser executing on the client device, executes a non-HTTP layer 7 protocol client that communicates with a non-HTTP layer 7 protocol service at an external network;
receiving, from the non-HTTP layer 7 protocol client executing in the browser, data related to the non-HTTP layer 7 protocol service; and
proxying the data related to the non-HTTP layer 7 protocol service over a layer 4 tunnel that is interfaced with the non-HTTP layer 7 protocol service.

18. The server of claim 17, wherein the code is in a WebAssembly format.

19. The server of claim 17, wherein the non-HTTP layer 7 protocol client is a Secure Shell Protocol (SSH) client, wherein the non-HTTP layer 7 protocol service is a SSH server, and wherein the SSH client executes in a tab of the browser.

20. The server of claim 17, wherein the operations further comprise:
   logging event data received from the non-HTTP layer 7 protocol client executing in the browser.

21. The server of claim 17, wherein the data related to the non-HTTP layer 7 protocol service is received over a WebSocket between the browser and the compute server.

22. The server of claim 17, wherein the set of one or more policies are based on one or more of identity, device posture, location, and/or risk signals.

23. The server of claim 17, wherein the operations further comprise:
   authenticating a user of the non-HTTP layer 7 protocol client with the non-HTTP layer 7 protocol service.

24. The server of claim 23, wherein authenticating the user includes performing one of: presenting a login prompt, presenting a prompt for a public key, and automatically performing a certificate generation and authentication.

\* \* \* \* \*